May 9, 1950 R. B. TEMPLE 2,507,285
DUAL WHEEL MOUNTING
Filed March 18, 1947

INVENTOR
Robert B. Temple
BY Maurice A. Crews
ATTORNEY

Patented May 9, 1950

2,507,285

UNITED STATES PATENT OFFICE 2,507,285

DUAL WHEEL MOUNTING

Robert B. Temple, Grosse Pointe, Mich., assignor to The Budd Company, Philadelphia, Pa., a corporation of Pennsylvania Application March 18, 1947, Serial No. 735,361

4 Claims. (Cl. 301—36)

The invention relates to a dual wheel mounting, and particularly to an improved such mounting for wheels having alternate in- and out-coined bosses on their bolting-in portions, such as are shown, for example, in Patent No. 2,195,589, issued April 2, 1940.

With the mounting shown in the patent, the wheels of the dual are identical and interchangeable, their mounting portions being provided on a bolt circle with an equal number of equally chordally spaced bolt holes, the bolt holes each being surrounded by a coined boss of generally conical form, alternate bosses being coined in opposite axial directions. The hub flange against which the wheels are adapted to be mounted is provided with recesses having seats with which the inwardly coined bosses of the inner wheel nest to lock the wheels against relative radial and circumferential movement with respect to the hub, and the two wheels have their respective bosses nest with each other to prevent relative radial and circumferential movement between the wheels of the pair. Through the axially aligned bolt holes of the wheels extend the fastening means for securing the pair of wheels to the hub flange. Each of these means comprises a stud secured to the hub flange and extending outwardly through the adjacent bolt holes of the wheels. These studs are screw threaded at their outer free ends and each receives a clamping nut having a conical face adapted to engage a similar seat on the outboard face of the outer wheel. When the nuts are tightened, the wheels are securely clamped in face-to-face engagement with each other and with the inner wheel in face-to-face engagement with the hub flange and with the inwardly extending bosses of the inner wheel located on their cooperating seats in the hub flange recesses and with the in- and out-coined bosses of the respective wheels locked in interseating engagement with each other.

This type of mounting has proved very effective in practice if proper care was exercised by the operator to have the in-coined and out-coined bosses of the respective wheels properly mated. It has however happened, on occasion, due to carelessness or otherwise, that the wheels were mounted on the studs with two oppositely coined bosses on the respective wheels in axial alignment, and if the nuts were tightened under this improper arrangement, damaging and insecure mounting of the wheels resulted.

To avoid this possibility of improper mounting of the wheels on the hub and to render the mounting fool-proof is the object of this invention.

This object is achieved by varying the chordal spacing of at least two bolt holes of each wheel and the corresponding studs carried by the hub flange from the chordal spacing of at least two others by an amount sufficient to make it impossible to mount the outer wheel of a pair of dual wheels unless it is first brought into the proper angular relation to the inner. Preferably the alternate ones of the bolt holes and of the studs are spaced different chordal distances so that but slight angular movement is required to bring the two wheels in proper nesting relation for secure mounting. The difference in chordal distance is preferably just enough to prevent mounting the wheels incorrectly yet not sufficiently great to weaken the wheels in the area of the bolt circles. As an example of such an arrangement, alternate chordal spacing between the holes of 3¾" and 4¼" might be selected for a six-hole eight-inch bolt circle where the chordal distance between equally spaced holes is 4".

In the accompanying drawings.

Figures 1, 2, 3, 4, 5, 6, 7, 8, 9:
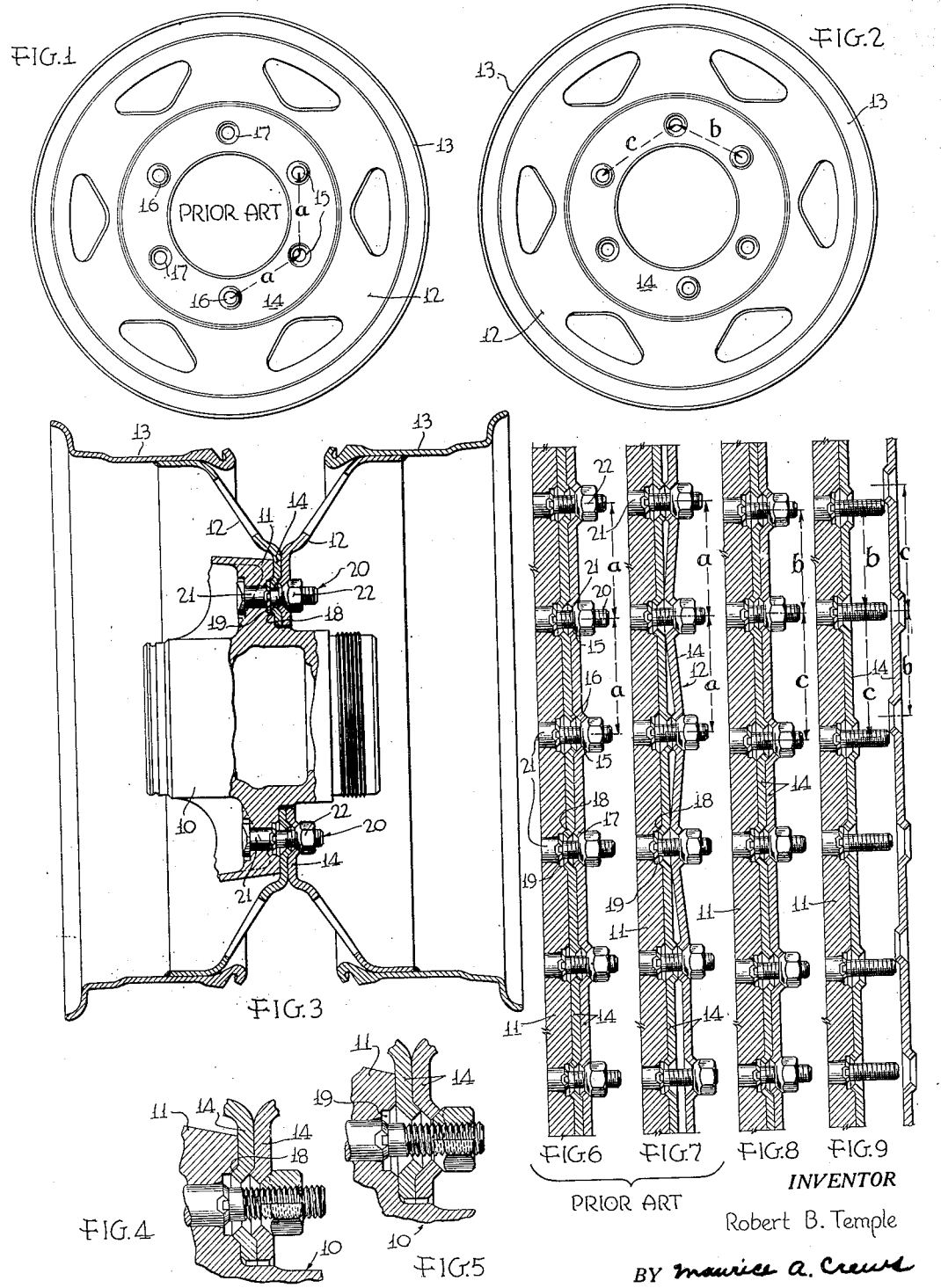
Fig. 1 is an outer face view of a wheel to which the invention may be applied, this view showing the wheel of the above referred to patent.
Fig. 2 is a similar view of a wheel as modified by the invention.
Fig. 3 is an axial section through a dual wheel mounting employing wheels of the type shown in Fig. 1 or Fig. 2.
Fig. 4 is an enlarged sectional detail view similar to the top bolting-on means of Fig. 3.
Fig. 5 is a similar enlarged detail sectional view similar to the bottom bolting-on means of Fig. 3.
Fig. 6 is a developed sectional view taken on the bolt circle of Fig. 3 showing wheels according to Fig. 1 mounted on the hub in the correct mounting.
Fig. 7 is a similar view showing how the wheels of Fig. 1 may be incorrectly mounted on the hub.
Fig. 8 is a similar view showing the wheels according to Fig. 2 correctly mounted on the hub.
Fig. 9 is an exploded view similar to Fig. 8 showing that it is impossible to mount the wheels of Fig. 2 incorrectly on the hub.

In the drawings, Figs. 1, 6 and 7 represent the prior art as shown in the above referred to patent, Figs. 2, 8 and 9 represent the novel improved construction, and Figs. 3, 4 and 5 are illustrative of both the old and the new construction.

The hub of the wheel is represented in all views by the numeral 10. It is provided with a radial flange 11 having a flat outboard face against which the wheels proper are adapted to be secured. The wheels are designated 12 and are shown as dished disc wheels having tire carrying rims 13 mounted on their outer peripheries and having inner radially extending mounting portions 14. As shown in Figs. 1, 6 and 7, this mounting portion has a circle of bolting-on holes 15, which are spaced equal chordal distances $a$ on a bolt circle. Alternate ones of these holes have out-coined and in-coined bosses of substantially frusto-conical form designated respectively 16 and 17. The inboard wheel, see Figs. 3, 4, 6 and 7, has its in-coined bosses nest with seats 18 formed in recesses 19 formed in the outboard flat face of the hub flange 11, while the out-coined and in-coined bosses of the respective wheels 12 of the dual wheel normally nest with each other, as clearly shown in Figs. 3, 4, 5 and 6. An annular series of fastening devices 20, in this instance consisting of studs 21 secured to the hub flange and nuts 22 cooperating with the outboard screw-threaded ends of the studs, clamp the wheel bodies securely to the hub flange, the nuts having conical seats engaging the corresponding seats on the outboard wheel body, all as taught by the above-mentioned patent.

Fig. 7 shows how it is possible with this known arrangement to bring the outboard wheel 12 into position with the in-coined bosses 17 thereon opposite the out-coined bosses 16 of the inboard wheel and with the out-coined bosses 16 thereon opposite the in-coined bosses 17 on the inboard wheel with the studs 21 still projecting some distance beyond the outboard wheel sufficient to apply the nuts 22 to the studs. A careless operator may not notice that the studs do not extend outwardly the usual distance beyond the outboard wheel and may tighten the nuts to produce a condition indicated in Fig. 7 in which the mounting portion of the outer wheel is distorted and interlocking seating of the conical bosses for preventing radial and circumferential relative movement between the outer and inner wheels is not attained. Such an incorrect mounting is dangerous since it may result in destruction of the wheel mounting and ultimate wheel failure.

By the novel improved construction shown in Figs. 2, 8 and 9, this danger is avoided and the wheel mounting made fool-proof.

As clearly shown in Figs. 2 and 8, the alternate bolt holes and studs are spaced different chordal distances from each other, as represented by the chords $b$ and $c$. This difference in distance is preferably just sufficient to prevent the placing of the outboard wheel over the studs if the said wheel is not in proper position for correct assembly, as represented clearly in Fig. 9. Otherwise, the construction of the wheel shown in Figs. 2 and 8 may be identical with the construction of Figs. 1 and 6 and the parts are referred to by corresponding reference numerals. It will be evident, therefore, that the dual wheel must always be assembled and secured correctly to the hub as shown in Figs. 3, 4, 5 and 8 since incorrect securement and assembly is made impossible by the novel construction.

As an alternative to the form shown, the wheels may have twice the number of bolt holes as compared with the number of studs and nuts with the studs and nuts engaging only the in-coined bosses of the outboard wheel. In such case, the chordal distances between two successive bolt holes would vary from the chordal distance between the next two successive such holes in exactly the same manner as the variation in chordal distance between successive bolt holes in the form shown. Of course, the bolting-on means in each case would have to vary in chordal distance in a manner similar to the bolt holes to properly line up with the bolt holes. This is made clear by Figs. 8 and 9.

While a specific embodiment of the invention has been herein described in detail, it will be understood that changes and modifications may be made by those skilled in the art without departing from the main features of the invention, and such changes and modifications are intended to be covered in the appended claims.

What is claimed is:

1. A dual wheel mounting for substantially identical dished disc wheels each having a mounting portion adapted to seat against a hub flange or against a similar mounting portion of the other wheel, in which the hub flange is provided with an annular series of bolting-on means each surrounded by a reentrant generally conical seat in said flange, and each of the wheels has its mounting portion formed with an annular series of holes surrounded by generally conical bosses coined alternately in and out, and in which the in-coined bosses of the inboard wheel nest with corresponding ones of said reentrant seats in the hub flange while the out- and in-coined bosses of the respective wheels nest with each other and the wheels and hub flange are firmly locked together when said bolting-on means extending through the wheel holes are tightened, characterized by the fact that certain of the bolting-on means and corresponding holes in the wheels are spaced at such different chordal distances from the chordal distances between other of said bolting-on means and the corresponding holes in the wheels as to make it impossible to secure the dual wheels to the hub flange in any other than their properly assembled relation to each other and to the hub flange, the difference in such chordal distances being just sufficiently great to avoid improper mounting but not sufficiently great to appreciably weaken the wheel attachment over the usual one in which the bolting-on means and the corresponding wheel holes are spaced equal chordal distances all around the bolt circle.

2. A dual wheel mounting for substantially identical disc wheels each having a mounting portion adapted to seat against a hub flange or against a similar mounting portion of the other wheel, in which the hub flange is provided with an annular series of bolting-on means each consisting of a stud secured to the hub flange and surrounded by a generally conical re-entrant seat in said flange and a nut for cooperation with said stud, and each of the wheels has its mounting portion formed with an annular series of holes receiving said studs and surrounded by generally conical bosses coined alternately in and out, and in which the in-coined bosses of the inboard wheel nest with corresponding ones of said reentrant seats in the hub flange while the out- and in-coined bosses of the respective wheels nest with each other and the wheels and hub flange are firmly locked together in this internested relation when the nuts are tightened on the studs, characterized by the fact that certain of the nuts and studs and the corresponding holes in the wheels are spaced at such different chordal distances from the chordal distances between other of said nuts and studs and the corresponding holes in the wheels as to make it impossible to place the wheels over the studs in any other than their properly assembled relation in which the in-coined and out-coined bosses on one wheel are axially aligned with the corresponding bosses on the other wheel, the difference in such chordal distances being just sufficiently great to avoid improper mounting but not sufficiently great to appreciably weaken the wheel attachment over the usual one in which the bolting-on means and the corresponding wheel holes are spaced equal chordal distances all around the bolt circle.

3. A dual wheel mounting for substantially identical disc wheels each having a mounting portion adapted to seat against a hub flange or against a similar mounting portion of the other wheel, in which the hub flange is provided with an annular series of bolting-on means each consisting of a stud secured to the hub flange and surrounded by a generally conical reentrant seat in said flange and a nut for cooperation with said stud, and each of the wheels has its mounting portion formed with an annular series of holes for receiving said studs and surrounded by generally conical bosses coined alternately in and out, and in which the in-coined bosses nest with corresponding ones of said reentrant seats in the hub flange while the out- and in-coined bosses of the respective wheels nest with each other and the wheels and hub flange are firmly locked together in internested relation when the nuts are tightened on the studs, characterized by the fact that the chordal distances between successive studs and wheel holes vary by an appreciable increment from the chordal distances between the next successive studs and wheel holes all around the bolt circle, thereby making it impossible to secure the dual wheels to the hub flange in any other than their properly assembled relation in which the in-coined and out-coined bosses on one wheel are axially aligned with the corresponding bosses on the other wheel.

4. A dual wheel mounting for a pair of substantially identical dished disc wheels each having a mounting portion adapted to seat against the hub flange or against a similar mounting portion of the other wheel, in which the hub flange is provided with an annular series of bolting-on means, and each of the wheels has its mounting portion formed with a corresponding annular series of holes for receiving said bolting on means therethrough, the mounting portion of each wheel being formed with a series of bosses extending axially from one face of the mounting portion which bosses are adapted to fit into a corresponding series of recesses formed in the mounting portion of the other wheel of the pair, and in which the wheels are firmly locked together, with the bosses and recesses interfitting, and to the hub flange when the bolting-on means extending through the wheel holes are tightened, characterized by the fact that the chordal distances between successive bolting-on means and wheel holes vary by an appreciable increment from the chordal distances between the next successive bolting-on means and wheel holes all around the bolt circle, thereby making it impossible to secure the dual wheels to the hub flange in any other than their properly assembled relation in which the bosses on one wheel fit the corresponding recesses in the other wheel.

ROBERT B. TEMPLE.

REFERENCES CITED

The following references are of record in the file of this patent:

UNITED STATES PATENTS

| Number | Name | Date |
| --- | --- | --- |
| 1,329,527 | Keegan | Feb. 3, 1920 |
| 2,195,589 | Eksergian | Apr. 2, 1940 |
| 2,286,950 | Breedlove | June 16, 1942 |